United States Patent
Iio et al.

(10) Patent No.: US 9,942,382 B2
(45) Date of Patent: Apr. 10, 2018

(54) ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Taro Iio, Yokohama (JP); Yuya Yamaguchi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/202,642

(22) Filed: Jul. 6, 2016

(65) Prior Publication Data

US 2017/0011613 A1 Jan. 12, 2017

(30) Foreign Application Priority Data

Jul. 9, 2015 (JP) .................. 2015-138168

(51) Int. Cl.
*H04M 1/72* (2006.01)
*G08B 21/08* (2006.01)
*H04M 1/725* (2006.01)
*H04M 1/22* (2006.01)

(52) U.S. Cl.
CPC ...... *H04M 1/72538* (2013.01); *G08B 21/088* (2013.01); *H04M 1/22* (2013.01); *H04M 1/72569* (2013.01)

(58) Field of Classification Search
CPC .......................... H04M 1/72538; G08B 21/088
USPC ........................................................ 340/635
See application file for complete search history.

(56) References Cited

U.S. PATENT DOCUMENTS

| | | | | |
|---|---|---|---|---|
| 6,366,736 B1* | 4/2002 | Nonaka | ................... | G03B 13/36 396/106 |
| 2011/0074945 A1* | 3/2011 | Watanabe | .............. | H04N 5/232 348/81 |
| 2012/0309241 A1* | 12/2012 | Yeo | ......................... | A63B 35/12 440/1 |
| 2013/0285809 A1 | 10/2013 | Sekiyama | | |

FOREIGN PATENT DOCUMENTS

| | | |
|---|---|---|
| JP | 2000-344185 A | 12/2000 |
| JP | 2003-345659 A | 12/2003 |
| JP | 2004-128547 A | 4/2004 |
| JP | 2007-184715 A | 7/2007 |
| JP | 2010-81375 A | 4/2010 |

(Continued)

OTHER PUBLICATIONS

Office Action in JP Application No. 2015-138168, dated Apr. 25, 2017, for which an explanation of relevance is attached.

*Primary Examiner* — Omar Casillashernandez
(74) *Attorney, Agent, or Firm* — Hauptman Ham, LLP

(57) ABSTRACT

There is provided an electronic device comprising: a first sensor configured to measure information for determining whether the electronic device is in water; a second sensor configured to measure information for determining whether the electronic device is held by a user of the electronic device; and at least one controller configured to determine whether the electronic device is in the water based on the information measured by the first sensor and thereafter determine whether the electronic device is held by the user of the electronic device based on the information measured by the second sensor.

12 Claims, 3 Drawing Sheets

(56) References Cited

FOREIGN PATENT DOCUMENTS

| | | | |
|---|---|---|---|
| JP | 2010-118759 | A | 5/2010 |
| JP | 2011-216947 | A | 10/2011 |
| JP | 2012-85031 | A | 4/2012 |
| JP | 2013-229826 | A | 11/2013 |

* cited by examiner

ELECTRONIC DEVICE, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2015-138168 filed in Japan on Jul. 9, 2015.

BACKGROUND

Field

The present application relates to an electronic device, a control method, and a non-transitory storage medium.

Description of the Related Art

There is a known type of life-saving lamp that is lit automatically when it falls into water and that contributes to discovery of a person who has fallen into water (for example, refer to Japanese Laid-open Patent Publication No. 2000-344185).

Conventional electronic devices have room for improvement in their functions to be executed at the time of detection when they fall into water, or the like.

SUMMARY

It is an object of embodiments to at least partially solve the problems in the conventional technology.

According to one aspect, there is provided an electronic device comprising: a first sensor configured to measure information for determining whether the electronic device is in water; a second sensor configured to measure information for determining whether the electronic device is held by a user of the electronic device; and at least one controller configured to determine whether the electronic device is in the water based on the information measured by the first sensor and thereafter determine whether the electronic device is held by the user of the electronic device based on the information measured by the second sensor.

According to one aspect, there is provided a control method executed by an electronic device, the method comprising: measuring information for determining whether the electronic device is in water; measuring information for determining whether the electronic device is held by a user of the electronic device; and determining whether the electronic device is in the water based on the information for determining whether the electronic device is in the water and thereafter determining whether the electronic device is held by the user of the electronic device based on the information for determining whether the electronic device is held by the user of the electronic device.

According to one aspect, there is provided a non-transitory storage medium that stores a control program that causes, when executed by an electronic device, the electronic device to execute: measuring information for determining whether the electronic device is in water; measuring information for determining whether the electronic device is held by a user of the electronic device; and determining whether the electronic device is in the water based on the information for determining whether the electronic device is in the water and thereafter determining whether the electronic device is held by the user of the electronic device based on the information for determining whether the electronic device is held by the user of the electronic device.

The above and other objects, features, advantages and technical and industrial significance of embodiments will be better understood by reading the following detailed description of the presently preferred embodiments, when considered in connection with the accompanying drawings.

DETAILED DESCRIPTION OF THE PREFERRED EMBODIMENTS

A plurality of embodiments for implementation of an electronic device, a control method, and a non-transitory storage medium, according to the present application, will be described in detail with reference to the drawings. Hereinafter, as an exemplary electronic device according to the present application, a smartphone will be described.

Figure 1:
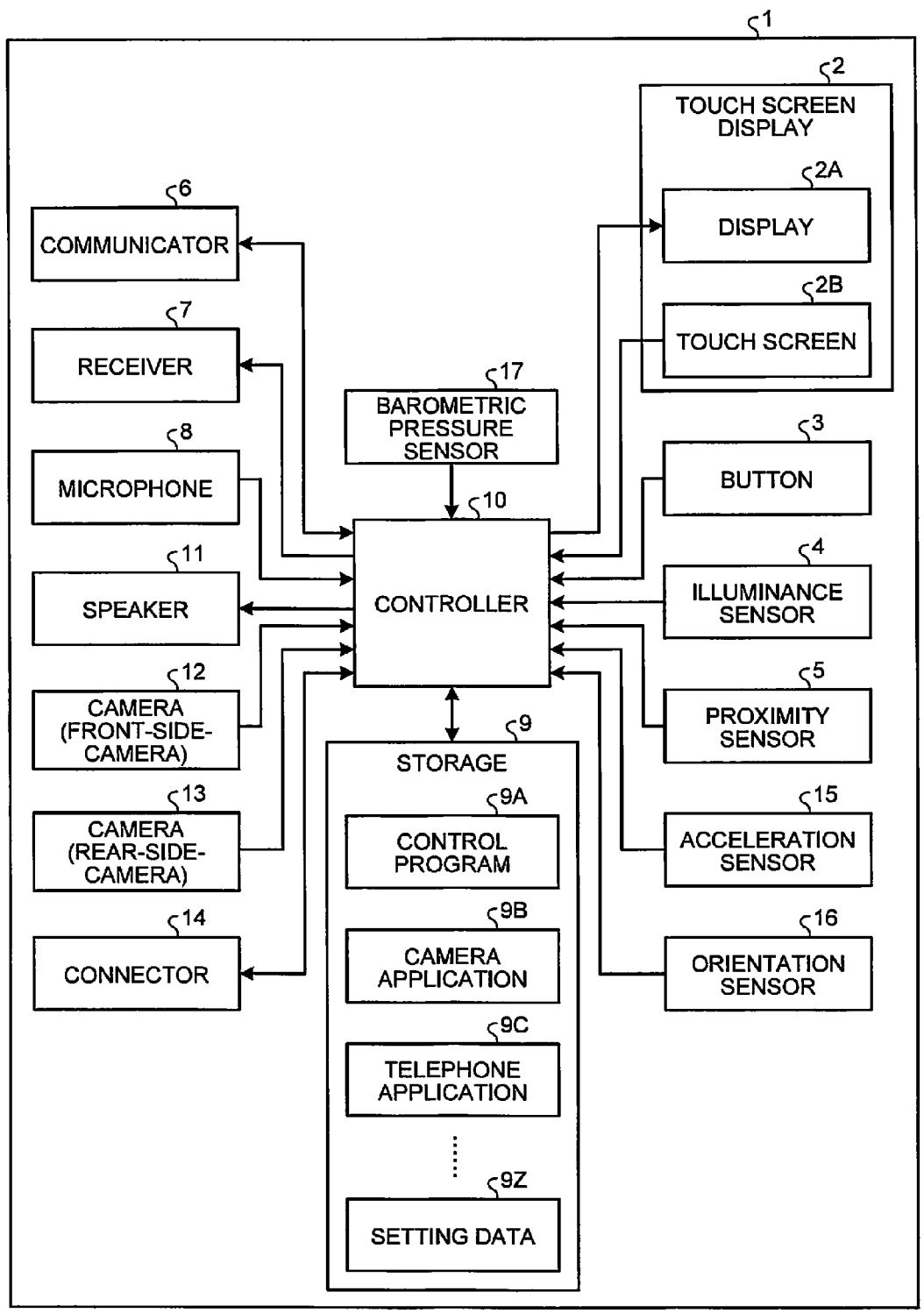
FIG. 1 is a block diagram illustrating a functional configuration of a smartphone according to embodiments.

An exemplary functional configuration of a smartphone 1 according to embodiments will be described with reference to FIG. 1. FIG. 1 is a block diagram illustrating a functional configuration of a smartphone according to embodiments. Hereinafter, there will be a case where a same reference sign is attached to similar components. Furthermore, there will be a case where overlapping description will be omitted.

As illustrated in FIG. 1, the smartphone 1 includes a touch screen display 2, a button 3, an illuminance sensor 4, a proximity sensor 5, a communicator 6, a receiver 7, a microphone 8, a storage 9, a controller 10, a speaker 11, a camera 12, a camera 13, a connector 14, an acceleration sensor 15, an orientation sensor 16, and an atmospheric pressure sensor 17. Hereinafter, the smartphone 1 will also be referred to as an "own device".

The touch screen display 2 includes a display 2A and a touch screen 2B. The display 2A and the touch screen 2B may be arranged, for example, one above the other, side by side, or separately from each other. In a case where the display 2A and the touch screen 2B are arranged one above the other on the touch screen display 2, it is allowable, for example, to arrange such that one or more sides of the display 2A are not positioned along with any of sides of the touch screen 2B.

The display 2A includes a display device such as a liquid crystal display (LCD), an organic electro-luminescence display (GELD), an inorganic electro-luminescence display (IELD). The display 2A can display characters, images, symbols, figures, or the like. Screens containing characters, images, symbols, figures, or the like, displayed by the display 2A include a screen referred to as a lock screen, a screen referred to as a home screen, and an application screen displayed during execution of an application. The home screen is also referred to as a desktop, a standby screen, an idle screen, a standard screen, an application list screen, or a launcher screen. In some embodiments, in a case where the display 2A includes a liquid crystal display, the liquid crystal display has a light source, such as a backlight, for emitting a light onto a liquid crystal panel. In some embodiments, in a case where the display 2A includes an organic electro-luminescence display or an inorganic electro-luminescence display, the organic electro-luminescence display or an inorganic electro-luminescence display includes a light emitting element corresponding to each of three primary colors, namely, R, G, and B. The display 2A is an exemplary display module.

The touch screen 2B detects contact of a finger, a pen, a stylus pen, or the like with the touch screen 2B. The touch screen 2B can detect a position on the touch screen 2B (hereinafter, referred to as a contact position) when a plurality of fingers, a pen, a stylus pen, or the like (hereinafter, simply referred to as a finger), comes in contact with the touch screen 2B (the touch screen display 2). The touch screen 2B informs the controller 10 of the contact of the finger with the touch screen 2B together with the contact position. In some embodiments, the touch screen 2B measures information for determining whether the own device is in the water. In a case where the touch screen 2B employs a capacitive type, it is possible to measure, for example, a change in capacitance as information for determining whether the own device is in the water. In a case where a resistive type or a load-sensitive type is employed, the touch screen 2B may be configured to detect, for example, a change in a voltage level, as information for determining whether the own device is in the water. In a case where a surface acoustic wave type is employed, the touch screen 2B may be configured to detect, for example, attenuation in a surface acoustic wave emitted from the own device, as information for determining whether the own device is in the water. In a case where an infrared type is employed, the touch screen 2B may be configured to detect, for example, attenuation in infrared light emitted from the own device, as information for determining whether the own device is in the water. In some embodiments, the touch screen 2B is an exemplary first sensor.

The touch screen 2B can employ not only the capacitive type but also any other type such as the resistive type, the load-sensitive type, the surface acoustic wave type, and the infrared type.

The controller 10 (smartphone 1) distinguishes a gesture type based on at least one of contact detected by the touch screen 2B, a position at which the contact has been detected, a change in the position at which the contact has been detected, an interval in which the contact has been detected, the number of times of detection of the contact. The gesture is operation performed on the touch screen 2B (the touch screen display 2) using a finger. Examples of the gestures distinguished by the controller 10 (the smartphone 1) via the touch screen 2B include but are not limited to touch, long touch, release, swipe, tap, double tap, long tap, drag, flick, pinch-in, and pinch-out.

The button 3 receives operation input from a user. The number of button 3 may be single or plural. The button 3 is an exemplary operation button.

The illuminance sensor 4 detects illuminance. Illuminance is a value of a light beam that is incident on a unit area of a measurement surface of the illuminance sensor 4. The illuminance sensor 4 is used, for example, to adjust luminance of the display 2A.

The proximity sensor 5 performs non-contact detection of presence of a neighboring object. The proximity sensor 5 detects the presence of an object based on a change in a magnetic field, a change in feedback time of a reflected wave of an ultrasonic wave, or the like. The proximity sensor 5 detects, for example, approaching of a face to the display 2A. The illuminance sensor 4 and the proximity sensor 5 may be configured as one sensor. The illuminance sensor 4 may be used as a proximity sensor.

The communicator 6 performs wireless communication. Examples of wireless communication standards supported by the communicator 6 may include but not limited to a communication standard for cellular phones such as 2G, 3G, and 4G, and a communication standard of short-distance wireless communication. Examples of communication standards for the cellular phones may include but not limited to long term evolution (LTE), wideband code division multiple access (W-CDMA), worldwide interoperability for microwave access (WiMAX, registered trademark), CDMA2000, personal digital cellular (PDC), a global system for mobile communications (GSM, registered trademark), and a personal handy-phone system (PHS). Examples of communication standards for short-distance wireless communication may include but not limited to IEEE802.11, Bluetooth (registered trademark), an infrared data association (IrDA), near field communication (NFC), and a wireless personal area network (WPAN). Examples of communication standards for the WPAN may include but not limited to ZigBee (registered trademark). The communicator 6 may support one or more of the above-described exemplary communication standards.

The receiver 7 is an audio output module. The receiver 7 outputs an audio signal transmitted from the controller 10, as sound. The receiver 7 can output, for example, sound of a video and sound of music reproduced on the smartphone 1, and voice of a partner on calling. The microphone 8 is an audio input module and converts voice, or the like, of the user to audio signals and transmits the signals to the controller 10.

The storage 9 stores a program and data. The storage 9 may be used as a work area for temporarily storing a processing result of the controller 10. The storage 9 may include any non-transitory storage medium such as a semiconductor storage medium and a magnetic storage medium. The storage 9 may include a plurality of types of storage media. The storage 9 may include a combination of a storage medium such as a memory card, an optical disk, or a magneto optical disk, with a reading device for the storage medium. The storage 9 may include a storage device such as a random access memory (RAM) that is used as a temporary storage area.

Programs stored in the storage 9 include applications executed foreground or background and an assistance program (not illustrated) that assists operation of the application. In a case where an application is executed foreground, for example, a screen corresponding to the application is displayed on the display 2A. The assistance program includes an OS, for example. The program may be installed onto the storage 9 via wireless communication by the communicator 6 or via a non-transitory storage medium.

The storage 9 stores a control program 9A, a camera application 9B, a telephone application 9C, setting data 9Z, or the like. The control program 9A may work in cooperation with various applications when providing various functions.

In some embodiments, the control program 9A can provide a function of determining whether the own device is in the water based on information measured by the touch screen 2B, and thereafter, determining whether the own device is held by the user of the own device based on information measured by the acceleration sensor 15.

The control program 9A can determine whether the own device is in the water by detecting a specific change observed when the own device is in the water, based on capacitance measured by the touch screen 2B. Specifically, when the own device is in the water, the capacitance measured by the touch screen 2B changes so as to indicate substantially uniform distribution in the vicinity of a certain constant value at each of contact points on the touch screen 2B. Accordingly, the controller 10 that executes the control program 9A can determine whether the own device is in the water by detecting this distribution. Conversely, the controller 10 that executes the control program 9A can also determine that the own device is not in the water by detecting distribution other than this distribution.

The control program 9A can determine whether the own device is in the water by detecting a specific change observed when the own device is in the water, based on a change in an atmospheric pressure value measured by the atmospheric pressure sensor 17. Specifically, when the own device falls in the water, the atmospheric pressure value measured by the atmospheric pressure sensor 17 indicates a sharply increase change. Accordingly, the controller 10 that executes the control program 9A can determine whether the own device is in the water by detecting presence or absence of this change.

On determination of whether the own device is in the water, the control program 9A may be configured to take into account both a determination result based on the touch screen 2B and a determination result based on the atmospheric pressure sensor 17. For example, it is allowable to configure such that, in a case where the control program 9A has obtained a determination result that the own device is in the water from at least one of the determination result based on the touch screen 2B and the determination result based on the atmospheric pressure sensor 17, the control program 9A executes a process to fix the determination result that the own device is in the water. Alternatively, it is allowable to configure such that, in case where the control program 9A has obtained a determination result that the own device is in the water from both the determination result based on the touch screen 2B and the determination result based on the atmospheric pressure sensor 17, the control program 9A executes a process to fix the determination result that the own device is in the water. Alternatively, it is allowable to configure such that, in a case where the determination result based on the touch screen 2B differs from the determination result based on the atmospheric pressure sensor 17, the control program 9A executes a process to fix the determination result that the own device is in the water by prioritizing the determination result based on the touch screen 2B.

In some embodiments, the control program 9A can provide a function of lighting the display 2A in a case where it has determined that the own device is in the water based on the information measured by the touch screen 2B and thereafter determined that the own device is not held by the user of the own device based on the information measured by the acceleration sensor 15.

In some embodiments, the control program 9A can provide a function of determining that the own device is not held by the user of the own device in a case where a state in which an acceleration value is less than or equal to a predetermined value has continued for a predetermined time.

In some embodiments, the storage 9 stores in advance a pattern of acceleration acting on the own device when the own device is swept away by the water. The control program 9A can provide a function of determining that the own device is not held by the user of the own device in a case where the pattern of acceleration measured by the acceleration sensor 15 coincides, with a predetermined accuracy, with the pattern of acceleration stored in the storage 9 in advance.

In some embodiments, the storage 9 stores in advance a pattern of acceleration acting on the own device when the own device is held by the user, in the water. The control program 9A can provide a function of determining that the own device is not held by the user of the own device in a case where the pattern of acceleration measured by the acceleration sensor 15 does not coincide, with a predetermined accuracy, with the pattern of acceleration stored in the storage 9 in advance.

In some embodiments, the control program 9A can provide a function of controlling lighting time of the display 2A and a duration between a light-out time and a relight-in time of the display 2A. In a case where the display 2A includes a liquid crystal display, the control program 9A can light up a backlight, or the like, for a predetermined time. When a predetermined time elapses after turning off the backlight, or the like, the control program 9A can re-light up the backlight, or the like. The control program 9A may control such that elapsed time required before re-lighting up the backlight, or the like, differs from the last elapsed time before re-lighting up the backlight in the last time. For example, the control program 9A can control such that, the longer the state of being determined that the device is in the water and the state of being determined that the own device is not held by the user, the shorter the elapsed time required before re-lighting up the backlight.

In a case where the display 2A includes an organic electro-luminescence display or an inorganic electro-luminescence display, the control program 9A can provide similar functions as the case where the display 2A includes a liquid crystal display. For example, the control program 9A can light up the light emitting element for a predetermined time. When a predetermined time elapses after turning off the light emitting element the control program 9A can re-light up the light emitting element. The control program 9A may control such that elapsed time required for re-lighting up the light emitting element differs from the last elapsed time before re-lighting up the backlight in the last time.

In some embodiments, the control program 9A can provide a function of adjusting an RGB balance at the time of lighting up the display 2A. Specifically, the control program 9A can provide a function of adjusting so as to allow the color to be easily visible for the user when the display 2A is lit in the water. Examples of the color easily visible in the water include but not limited to orange, white, yellow, and green. In a case where the display 2A includes a liquid crystal display, for example, the control program 9A can provide a function of adjusting display of the display 2A to be generally green by controlling liquid crystal alignment of the liquid crystal display to achieve color adjustment in which light intensity of an R component and a B component is decreased and light intensity of a G component is not decreased among RGB components of the liquid crystal display. In a case where the display 2A includes, for example, a light emitting element such as an organic EL, the control program 9A can provide a function of adjusting the display of the display 2A to be generally green by adjusting so as to increase light intensity of the light emitting element corresponding to the G component. By adjusting the display of the display 2A to be generally green, the display 2A is more easily identified in an environment such as in the water, particularly in the sea water, where light of the R component is easily attenuated and light of the B component is hardly identified. The control program 9A can provide a function of lighting in various modes such as continuous lighting, blinking, and color change on lighting up the display 2A.

In some embodiments, it is allowable to configure such that the control program 9A provides a function of limiting part of functions installed on the own device in a case where the control program 9A has determined that the own device is in the water based on the information measured by the touch screen 2B and thereafter determined that the own device is not held by the user of the own device based on the information measured by the acceleration sensor 15. The functions to be limited include functions to allow access to personal information among functions installed on the own device. The functions to allow access to personal information include functions to browse an address book and a memo pad, and functions to browse social network services (SNS).

In some embodiments, it is allowable to configure such that the control program 9A provides a function of initializing the storage 9 in a case where the control program 9A has determined that the own device is in the water based on the information measured by the touch screen 2B and thereafter determined that the own device is not held by the user of the own device based on the information measured by the acceleration sensor 15.

The camera application 9B provides functions of performing still picture imaging, moving picture imaging, editing, management, or the like, of an image. The telephone application 9C provides a call function for calling via wireless communication.

The setting data 9Z include various data used for processing, or the like, executed based on functions provided by the control program 9A, or the like. The setting data 9Z include data used for determining whether the own device is in the water. Data used for determining whether the own device is in the water include reference data regarding distribution of the amount of change in capacitance in the water and reference data regarding the change in atmospheric pressure in the water. The setting data 9Z include data regarding a pattern of acceleration acting on the own device when the own device is swept away by the water. The setting data 9Z include data regarding a pattern of acceleration acting on the own device when the own device is held by the user in the water. The setting data 9Z include control data for controlling lighting time of the display 2A, and a duration between a light-out time and a relight-in time of the display 2A.

The controller 10 includes an operation processing unit. Examples of the operation processing unit include but are not limited to a central processing unit (CPU), a system-on-a-chip (SoC), a micro control unit (MCU), a field-programmable gate array (FPGA), and a coprocessor. The controller 10 integrally controls operation of the smartphone 1 to implement various functions. The controller 10 is an exemplary controller.

Specifically, the controller 10 executes commands contained in a program stored in the storage 9 with reference to data stored in the storage 9, as required. Then, the controller 10 controls functional modules according to the data and commands, thereby implementing various functions. Examples of the functional modules include but are not limited to the display 2A, the communicator 6, the microphone 8, and the speaker 11. The controller 10 might change control according to a result of detection by the detection module. Examples of the detection module include but are not limited to the touch screen 2B, the button 3, the illuminance sensor 4, the proximity sensor 5, the microphone 8, the camera 12, the camera 13, the acceleration sensor 15, the orientation sensor 16, and the atmospheric pressure sensor 17.

The controller 10 executes the control program 9A thereby implementing processing such as determining whether the own device is in the water based on information measured by the touch screen 2B, and thereafter, determining whether the own device is held by the user of the own device based on information measured by the acceleration sensor 15.

The speaker 11 is an audio output module. The speaker 11 outputs an audio signal transmitted from the controller 10 as sound. The speaker 11 is used to output a ring tone and music, for example. One of the receiver 7 and the speaker 11 may include a function of the other.

Each of the cameras 12 and 13 converts a captured image into an electrical signal. The camera 12 is a front-side-camera to image an object facing the display 2A. The camera 13 is a rear-side-camera to image an object facing a surface on an opposite side of the display 2A. The cameras 12 and 13 may be mounted on the smartphone 1 while being functionally and physically integrated as a camera unit on which the front-side-camera and the rear-side-camera are mutually switchable.

The connector 14 is a terminal to which other devices are connected. The connector 14 may be a general-purpose terminal such as a universal serial bus (USB), a high-definition multimedia interface (HDMI,registered trademark), Light Peak (Thunderbolt,registered trademark), and an earphone/microphone connector. The connector 14 may be a dedicated terminal such as a dock connector. Examples of the devices connected to the connector 14 include but are not limited to an external storage, a speaker, and a communication device.

The acceleration sensor 15 detects a direction and magnitude of acceleration acting on the smartphone 1. The acceleration sensor 15 is an exemplary second sensor.

The orientation sensor 16 detects, for example, a geomagnetic field direction and detects a direction (orientation) of the smartphone 1 based on the geomagnetic field direction.

The atmospheric pressure sensor 17 measures a value of atmospheric pressure acting on the smartphone 1. The atmospheric pressure sensor 17 is an exemplary first sensor.

In addition to the above-described functional modules, the smartphone 1 may further include a GPS receiver and a vibrator. The GPS receiver receives radio wave signals of a predetermined frequency zone from GPS satellites. The GPS receiver performs demodulation processing on the received radio wave signals and transmits the processed signals to the controller 10. The GPS receiver supports operation processing of a current position of the smartphone 1. The vibrator vibrates a portion or whole of the smartphone 1. The vibrator includes, for example, a piezoelectric element and an eccentric motor to generate vibration. The smartphone 1 includes a functional module inevitably used for maintaining functions of the smartphone 1, and a controller inevitably used for implementing control of the smartphone 1.

Figure 2:
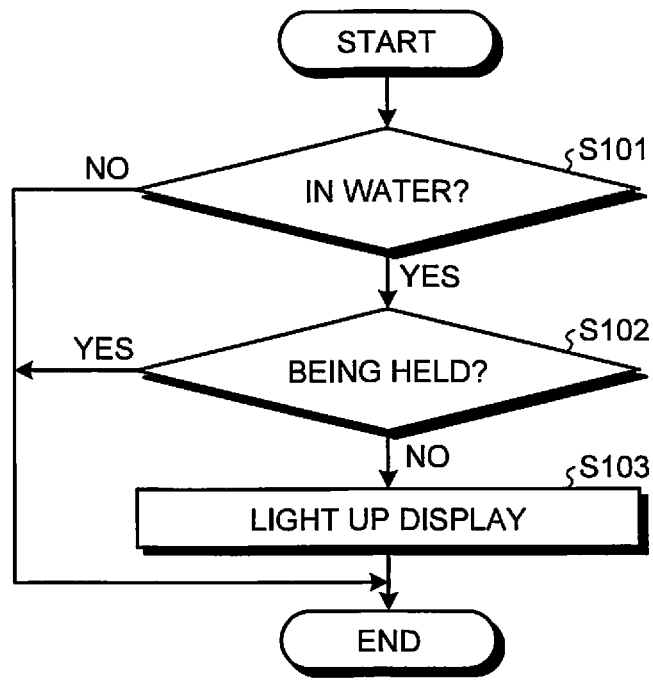
FIG. 2 is a flowchart illustrating a flow of processing of the smartphone according to embodiments.
Figure 3:
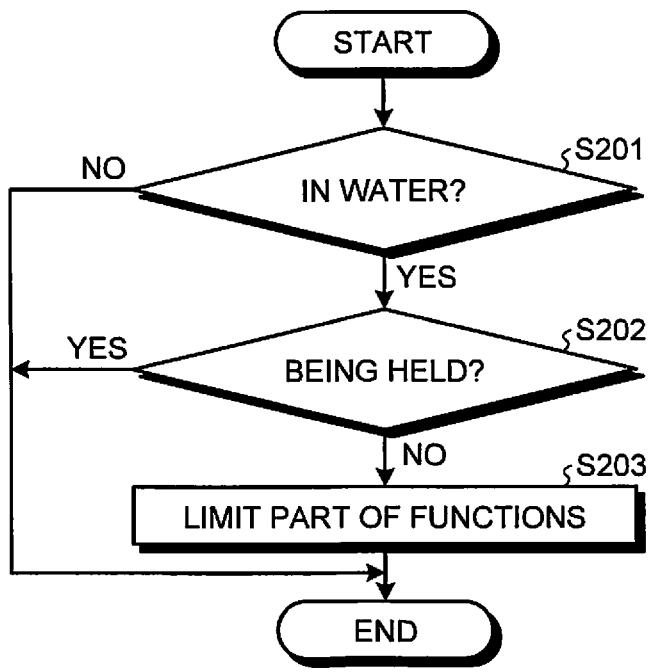
FIG. 3 is a flowchart illustrating a flow of processing of the smartphone according to embodiments.
Figure 4:
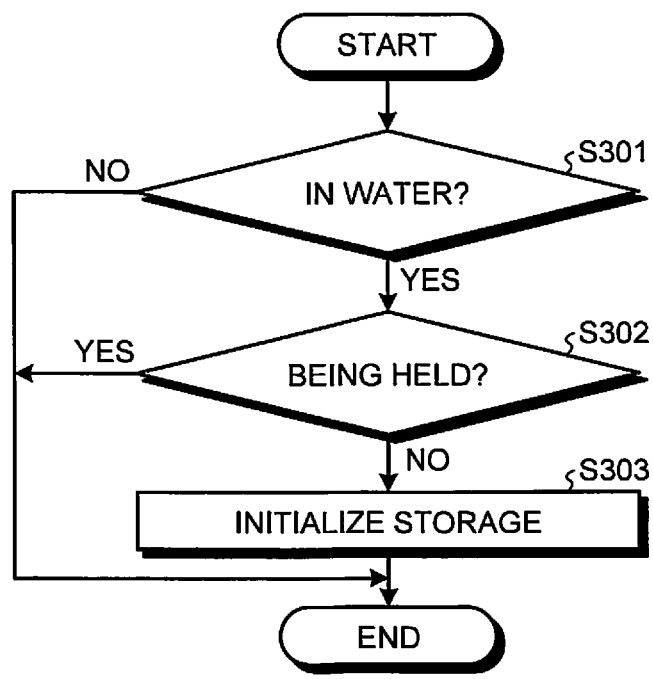
FIG. 4 is a flowchart illustrating a flow of processing of the smartphone according to embodiments.

A flow of processing executed by the smartphone 1 according to embodiments will be described with reference to FIGS. 2 to 4. FIGS. 2 to 4 are flowcharts each illustrating a flow of processing of the smartphone according to embodiments. Processing illustrated in FIGS. 2 to 4 are implemented by execution of the control program 9A stored in the storage 9, by the controller 10.

FIG. 2 is exemplary processing to activate a light-emitting module performed in a case where the smartphone 1 has determined that the own device is in the water and thereafter determined that the own device is not held by the user of the own device.

As illustrated in FIG. 2, the controller 10 determines (step S101) whether the own device is in the water based on at least one of a measurement result by the touch screen 2B and a measurement result by the atmospheric pressure sensor 17.

When it is determined that the own device is in the water (Yes at step S101), then, the controller 10 determines (step S102) whether the own device is held by the user of the own device based on the measurement result by the acceleration sensor 15.

When it is determined that the own device is not held by the user of the own device (No at step S102), then, the controller 10 lights up the display 2A (step S103) and finishes processing illustrated in FIG. 2.

When it is determined at step S102 that the own device is held by the user of the own device (Yes at step S102), the controller 10 finishes the processing illustrated in FIG. 2.

When it is determined at step S101 that the own device is not in the water (No at step S101), the controller 10 finishes the processing illustrated in FIG. 2.

FIG. 3 illustrates exemplary processing to limit part of functions installed on the own device in a case where the smartphone 1 has determined that the own device is in the water and thereafter determined that the own device is not held by the user of the own device.

As illustrated in FIG. 3, the controller 10 determines (step S201) whether the own device is in the water based on at least one of the measurement result by the touch screen 2B and the measurement result by the atmospheric pressure sensor 17.

When it is determined that the own device is in the water (Yes at step S201), then, the controller 10 determines (step S202) whether the own device is held by the user of the own device based on the measurement result by the acceleration sensor 15.

When it is determined that the own device is not held by the user of the own device (No at step S202), then, the controller 10 limits part of functions installed on the own device (step S203) and finishes processing illustrated in FIG. 3.

When it is determined at step S202 that the own device is held by the user of the own device (Yes at step S202), the controller 10 finishes the processing illustrated in FIG. 3.

When it is determined at step S201 that the own device is not in the water (No at step S201), the controller 10 finishes the processing illustrated in FIG. 3.

FIG. 4 illustrates exemplary processing to initialize the storage 9 performed in a case where the smartphone 1 has determined that the own device is in the water and thereafter determined that the own device is not held by the user of the own device.

As illustrated in FIG. 4, the controller 10 determines (step S301) whether the own device is in the water based on at least one of the measurement result by the touch screen 2B and the measurement result by the atmospheric pressure sensor 17.

When it is determined that the own device is in the water (Yes at step S301), then, the controller 10 determines (step S302) whether the own device is held by the user of the own device based on the measurement result by the acceleration sensor 15.

When it is determined that the own device is not held by the user of the own device (No at step S302), then, the controller 10 initializes the storage 9 (step S303) and finishes processing illustrated in FIG. 4.

When it is determined at step S302 that the own device is held by the user of the own device (Yes at step S302), the controller 10 finishes the processing illustrated in FIG. 4.

When it is determined at step S301 that the own device is not in the water (No at step S301), the controller 10 finishes the processing illustrated in FIG. 4.

In above-described embodiments, the smartphone 1 determines whether the own device is in the water based on information measured by the touch screen 2B, and thereafter, determines whether the own device is held by the user of the own device based on information measured by the acceleration sensor 15. Therefore, according to above-described embodiments, it is possible to distinguish a state where the smartphone 1 has fallen into the water and a state where the smartphone 1 is operated by the user, in the water. The smartphone 1, when it has determined that the own device is not held by the user of the own device, lights up the display 2A. Alternatively, the smartphone 1, when it has determined that the own device is not held by the user of the own device, limits part of functions installed on the own device. Alternatively, the smartphone 1, when it has determined that the own device is not held by the user of the own device, initializes the storage 9. In this manner, according to above-described embodiments, it is possible to improve functions to be executed on the smartphone 1 on detecting of falling thereof in the water, or the like.

Above-described embodiments have demonstrated examples in which the display 2A is lit in a case where the smartphone 1 has been determined to be in the water and has been determined not to be held by the user. The embodiments, however, are not limited to these examples. For example, it is allowable to configure such that, when the smartphone 1 has determined that it is in the water and it is not held by the user, the smartphone 1 lights up a flashlight mounted on the camera 12 and the camera 13. Alternatively, it is allowable to configure such that the smartphone 1 is provided with a light-emitting device independent from other devices, and lights up the light-emitting device in a case where it is determined that the smartphone 1 is in the water and is not held by the user.

The processing in above-described embodiments can similarly be applied to other electronic devices besides the smartphone 1 that are expected to be operated in the water.

In the present description, specific embodiments have been described in order to completely and definitely disclose techniques according to the claims attached hereto. The attached claims, however, are not intended to be limited to embodiments described herein but are intended to be embodied in a variety of forms, modifications and alternatives that may be made possible by those skilled in the art, within the scope and the spirit of the fundamental matters described in the present description.

What is claimed is:
1. An electronic device comprising:
 a first sensor configured to measure information for determining whether the electronic device is in water;
 a second sensor configured to measure information for determining whether the electronic device is held by a user of the electronic device;
 at least one controller configured to determine whether the electronic device is in the water based on the information measured by the first sensor and thereafter determine whether the electronic device is held by the user of the electronic device based on the information measured by the second sensor; and
 a display, wherein the second sensor measures acceleration acting on the electronic device, as the information for determining whether the electronic device is held by the user of the electronic device, and the at least one controller lights up the display in a case where the at least one controller has determined that the electronic device is in the water based on the information measured by the first sensor and thereafter has determined that the electronic device is not held by the user of the electronic device based on the information measured by the second sensor.

2. The electronic device according to claim 1, wherein the at least one controller determines that the electronic device is not held by the user of the electronic device in a case where a state in which a value of the acceleration is less than or equal to a predetermined value has continued for a predetermined time.

3. The electronic device according to claim 1, further comprising a storage configured to store in advance a pattern of acceleration acting on the electronic device when the electronic device is swept away by the water, wherein the at least one controller determines that the electronic device is not held by the user of the electronic device in a case where a pattern of acceleration measured by the second sensor coincides, with a predetermined accuracy, with the pattern of acceleration stored in advance in the storage.

4. The electronic device according to claim 1, further comprising a storage configured to store in advance a pattern of acceleration acting on the electronic device when the electronic device is held by the user, in the water, wherein the at least one controller determines that the electronic device is not held by the user of the electronic device in a case where a pattern of acceleration measured by the second sensor does not coincide, with a predetermined accuracy, with the pattern of acceleration stored in advance in the storage.

5. The electronic device according to claim 1, wherein the at least one controller controls lighting time of the display and a duration between a light-out time and a relight-in time of the display.

6. The electronic device according to claim 1, wherein the at least one controller adjusts an RGB balance on lighting up the display.

7. The electronic device according to claim 1, wherein the first sensor includes at least one of a touch screen and an atmospheric pressure sensor.

8. The electronic device according to claim 1, further comprising a light emitter, wherein the at least one controller lights up the light emitter in a case where the at least one controller has determined that the electronic device is in the water based on the information measured by the first sensor and thereafter has determined that the electronic device is not held by the user of the electronic device based on the information measured by the second sensor.

9. The electronic device according to claim 1, wherein the at least one controller limits part of functions installed on the electronic device in a case where the at least one controller has determined that the electronic device is in the water based on the information measured by the first sensor and thereafter determined that the electronic device is not held by the user of the electronic device based on the information measured by the second sensor.

10. The electronic device according to claim 1, further comprising a storage, wherein the at least one controller initializes the storage in a case where the at least one controller has determined that the electronic device is in the water based on the information measured by the first sensor and thereafter determined that the electronic device is not held by the user of the electronic device based on the information measured by the second sensor.

11. A control method executed by an electronic device, the method comprising:

measuring first information for determining whether the electronic device is in water;

measuring second information for determining whether the electronic device is held by a user of the electronic device; and determining whether the electronic device is in the water based on the first information for determining whether the electronic device is in the water and thereafter determining whether the electronic device is held by the user of the electronic device based on the second information for determining whether the electronic device is held by the user of the electronic device, wherein the electronic device has a display, and wherein the method comprises:

measuring acceleration acting on the electronic device, as the second information for determining whether the electronic device is held by the user of the electronic device; and lighting up the display in a case where the electronic device has determined that the electronic device is in the water based on the first information and thereafter the electronic device has determined that the electronic device is not held by the user of the electronic device based on the second information.

12. A non-transitory storage medium that stores a control program that causes, when executed by an electronic device, the electronic device to execute a control method comprising:

measuring first information for determining whether the electronic device is in water;

measuring second information for determining whether the electronic device is held by a user of the electronic device; and determining whether the electronic device is in the water based on the first information for determining whether the electronic device is in the water and thereafter determining whether the electronic device is held by the user of the electronic device based on the second information for determining whether the electronic device is held by the user of the electronic device, wherein the electronic device has a display, and wherein the method comprises:

measuring acceleration acting on the electronic device, as the second information for determining whether the electronic device is held by the user of the electronic device; and lighting up the display in a case where the electronic device has determined that the electronic device is in the water based on the first information and thereafter the electronic device has determined that the electronic device is not held by the user of the electronic device based on the second information.

* * * * *